United States Patent Office 3,151,996
Patented Oct. 6, 1964

3,151,996
ADHESIVE COMPOSITION AND PROCESS OF MAKING CORRUGATED PAPERBOARD THEREWITH
Armand J. Desmarais, Wilmington, Del., assignor to Hercules Powder Company, Wilmington, Del., a corporation of Delaware
No Drawing. Filed Jan. 26, 1961, Ser. No. 85,006
7 Claims. (Cl. 106—213)

The present invention relates to improved adhesive compositions and process of making corrugated paperboard therewith.

Corrugated paperboard is a laminated paperboard containing at least one flat sheet of paper and at least one corrugated sheet of paper, the two sheets being permanently held together with an adhesive. The two most common types consist of (1) one flat sheet bound to one side of a corrugated sheet and (2) a corrugated sheet sandwiched between two flat sheets, and these types are often referred to in the art as single-face and double-face corrugated paperboard, respectively. The flat sheets are known as the liners.

In making single-face corrugated paperboard a sheet of paper is corrugated by passing between fluted rolls which are heated, applying an adhesive to the tips of the corrugations on one side of the sheet, bringing a liner in contact with the tips containing the adhesive, and subjecting the assembly to heat and pressure and thereby bonding the two sheets together. This completes the preparation of a single-face corrugated paperboard. If a double-face corrugated paperboard is desired, another liner is applied and bonded in like manner to the opposite side of the corrugated sheet.

In general, the faster one is able to operate the machine which makes the corrugated paperboard final product the better because it makes for higher production efficiency. The rate of production is measured in linear feet of corrugated paperboard product made per minute. It is quite desirable to have as much latitude as possible in production rate. The desirability of being able to operate at maximum production rate is obvious because it increases production capacity for a given machine. The desirability of being able to operate at a very slow production rate is based on the following. In some of the plants today both single-face and double-face products are made, and in making double-face products different machines apply each liner. Although two different machines apply each liner of the double-face products, the machines are operated at the same speed since the single-face product passes directly from the first machine only a short distance over a conveyor to reach the second machine. If one of the machines must be slowed down for any reason, it is desirable to be able to reduce the speed of the other machine so as to equalize the two. The ability to operate within a wide machine speed also has the advantage of making the over-all operation more versatile with a given number of machines, especially when single-face and double-face products are being made at the same time.

According to the present invention I have provided an adhesive composition which enables operating over a substantially wider range of speed than heretofore found possible, and at the same time I obtain corrugated paperboard of excellent bond and very good properties in general. More specifically, the adhesive composition used must contain an ungelatinized starch, a gelatinized hydroxyalkyl starch, an alkaline earth metal hydroxide and water, the ungelatinized starch being suspended in the water in the presence of the other constituents. Preferably, the adhesive composition will also contain a gelatinized underivatized starch in addition to the gelatinized hydroxyalkyl starch.

The following examples illustrate specific embodiments of the present invention, but they are not intended to limit the invention beyond the scope of the claims of this application. In the examples and elsewhere herein parts are by weight and are based on 100 parts of the ungelatinized starch used. The various adhesive compounds of these examples were used to make both single-face and double-face corrugated paperboard at machine speeds as low as 50 and as high as 1,000 linear feet of corrugated paperboard finished product per minute. These adhesive compositions gave good wet tack and high bonding strength. Their viscosity fell within the range of about 25–50 seconds (Stein-Hall cup at 100° F.), and their pH fell within the range of approximately 8.5–12. Further details are given in Table 1 which follows.

Table 1 [1]

| Ex. No. | Ungelatinized Starch | Gelatinized Starch | Gelatinized Hydroxy-Alkyl Starch | Lime, Ca(OH)$_2$ | Water | Gelatinization Temp., °F.±1° F. |
|---|---|---|---|---|---|---|
| 1 | 100 | 18.5 | 4.9 | 0.5 | 434.8 | 142 |
| 2 | 100 | None | 24 | 0.2 | 426.5 | 145 |
| 3 | 100 | None | 24 | 0.5 | 426.5 | 145 |
| 4 | 100 | None | 20.5 | 0.2 | 426.5 | 145 |
| 5 | 100 | None | 20.5 | 0.5 | 426.5 | 145 |
| 6 | 100-C | None | 24-C | 1.16 | 426.5 | 144 |
| 7 | 100-C | None | 20.5-C | 1.16 | 426.5 | 144 |
| 8 | 100 | None | 24-C | 0.2 | 426.5 | 145 |
| 9 | 100 | None | 20.5-C | 0.5 | 426.5 | 145 |
| 10 | 100-C | None | 24 | 1.16 | 426.5 | 144 |
| 11 | 100-C | None | 20.5 | 1.16 | 426.5 | 144 |
| 12 | 100 | 20.5 | 2.84 | 0.5 | 426.5 | 142 |
| 13 | 100 | 20.5 | 2.84-C | 0.5 | 426.5 | 142 |
| 14 | 100 | 17.9-C | 2.84 | 0.5 | 426.5 | 142 |
| 15 | 100 | 17.9-C | 2.84-C | 0.5 | 426.5 | 142 |
| 16 | 100-C | 17.9 | 4.9 | 1.16 | 426.5 | 138 |
| 17 | 100-C | 15.6-C | 4.9-C | 1.16 | 426.5 | 144 |
| 18 | 100 | 20.5 | 4.9 | 0.27 | 426.5 | 143 |
| 19 | 100 | 17.9-C | 4.9-C | 0.27 | 426.5 | 143 |

[1] Unless otherwise indicated all quantities are parts by weight. Unless otherwise indicated all starches are wheat starch; C=corn starch.
In all examples, I used 1.81 parts sodium borate hexahydrate, 1.81 parts bentonite and 1.42 parts trisodium phosphate.

All prior art corrugating adhesive compositions of which I am aware contain a base chiefly to lower the gelatinization temperature and to decrease the gelatinization time of the ungelatinized starch in the adhesive composition, and this base is almost invariably an alkali metal hydroxide (normally sodium hydroxide). Occasionally, a nonalkaline adhesive composition is desired for specific applications, and in this event the prior art uses such materials as urea, formaldehyde, zinc chloride, etc., in place of an alkali metal hydroxide. To my surprise, I have found that the performance of my corrugating adhesive composition is quite unsatisfactory unless I use an alkaline earth metal hydroxide, preferably calcium hydroxide. This was determined after a number of experiments in which I unsuccessfully attempted to use such other compounds, including sodium hydroxide, in place of alkaline earth metal hydroxides. The amount of alkaline earth metal hydroxide, calculated as calcium hydroxide, is also critical and must fall within the range of 0.2–1.16 parts per 100 parts of ungelatinized starch used. The particular amount of calcium hydroxide, i.e. lime, used within this range depends largely on the type of ungelatinized starch used because these have different gelatinization temperatures. For example, with wheat and potato starch as the ungelatinized starch, I prefer to use about 0.2–0.5 part of lime per 100 parts of ungelatinized starch, whereas with corn and tapioca starch as the ungelatinized starch, I prefer to use about 0.65–1.16 parts of lime per 100 parts of ungelatinized starch.

As those skilled in this art will appreciate, various modifications can be made in the foregoing examples within the scope of the claims of this application. Thus starches in general (e.g., cereal, tuber, etc.) may be used whenever a starch is called for in the adhesive composition, wheat, corn, rice, potato, and tapioca starches being the most common ones. The amount of gelatinized underivatized starch and gelatinized hydroxyalkyl starch may be 0–20.5 and 2.85–24 parts per 100 parts of ungelatinized starch, respectively; however, I prefer to use some gelatinized underivatized starch in all cases.

Although it is well known in the art, for the sake of completeness it should be pointed out that the ungelatinized starch serves as the main source of adhesive, the gelatinized starch and hydroxyalkyl gelatinized starch serve largely as a carrier for the ungelatinized starch. However, the gelatinized starch also affects the viscosity of the adhesive mixture and the hydroxyalkyl gelatinized starch also increases the tack of the adhesive mixture which is important in transferring the adhesive mixture to the paper by means of a roll.

As is well known in the art, both the types and amounts of material may be varied with respect to the sodium borate decahydrate, the bentonite and the trisodium phosphate. The sodium borate decahydrate is used mostly as a viscosity control, and other materials besides this which may be used in my invention include, for example, other borates and aluminates. The bentonite is used primarily as a suspension stabilizer, and other materials which may be used in place of the bentonite include, for example, other clay inert fillers. The trisodium phosphate serves as a surfactant, and other materials besides this which may be used in my invention include, for example, water-soluble sulfonated oils, alcohols, soaps or fatty substances effective as wetting agents.

"Total solids content" is used herein to mean all of the ingredients, except water, in the adhesive composition, and it is given herein as percent by weight of the entire adhesive composition, including water. Although the total solids content which may be used is not critical, it is important, and it is well known in the art within what range of total solids content one would normally operate. I prefer to operate within a range of about 20%–25% total solids content.

It is also well known in the art within what temperature range one would usually prepare the corrugated paperboard products of this invention, one of the prime considerations being the gelatinization temperature of the ungelatinized starch employed. This gelatinization temperature, of course, will vary somewhat depending on a number of things including, e.g., the particular type of ungelatinized starch used and the amounts of other constituents in the adhesive composition. In general, I prefer to operate within a temperature range of about 138° F.–145° F.

Likewise, it is well known in the art what pressures are operable in preparing the corrugated paperboard products of my invention. Thus it is known that one uses a pressure sufficient to give adequate adhesion of the liner to the corrugated core but insufficient to substantially crush or permanently compress the corrugated core.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. An improved adhesive composition for use in making corrugated paperboard which consists essentially of ungelatinized starch, gelatinized hydroxyalkyl starch, an alkaline earth metal hydroxide, and water, the ungelatinized starch being suspended in the water in the presence of the other constituents, the amounts of gelatinized hydroxyalkyl starch and alkaline earth metal hydroxide being 2.84–24 and 0.2–1.16 parts per 100 parts of ungelatinized starch, respectively.

2. An improved adhesive composition for use in making corrugated paperboard which consists essentially of ungelatinized starch, gelatinized hydroxyalkyl starch, a suspension stabilizer, a water-soluble alkali metal phosphate as surfactant, an alkaline earth metal hydroxide, and water, the ungelatinized starch being suspended in the water in the presence of the other constituents, the amounts of gelatinized hydroxyalkyl starch and alkaline earth metal hydroxide being 2.84–24 and 0.2–1.16 parts per 100 parts of ungelatinized starch, respectively.

3. An improved adhesive composition for use in making corrugated paperboard which consists essentially of ungelatinized wheat starch, gelatinized hydroxyalkyl starch, a suspension stabilizer, a water-soluble alkali metal phosphate as surfactant, an alkaline earth metal hydroxide, and water, the ungelatinized wheat starch being suspended in the water in the presence of the other constituents, the amounts of gelatinized hydroxyalkyl starch and alkaline earth metal hydroxide being 2.84–24 and 0.2–0.5 parts per 100 parts of ungelatinized wheat starch, respectively.

4. An improved adhesive composition for use in making corrugated paperboard which consists essentially of ungelatinized wheat starch, gelatinized wheat starch, gelatinized hydroxyalkyl wheat starch, a suspension stabilizer, a water-soluble alkali metal phosphate as surfactant, an alkaline earth metal hydroxide, and water, the ungelatinized wheat starch being suspended in the water in the presence of the other constituents, the amounts of gelatinized wheat starch, gelatinized hydroxyalkyl wheat starch and alkaline earth metal hydroxide being up to 20.5, 2.84–24 and 0.2–0.5 parts per 100 parts of ungelatinized wheat starch, respectively.

5. An improved adhesive composition for use in making corrugated paperboard which consists essentially of ungelatinized wheat starch, gelatinized wheat starch, gelatinized hydroxyalkyl wheat starch, a water-soluble borate, a suspension stabilizer, a water-soluble alkali metal phosphate, an alkaline earth metal hydroxide, and water, the ungelatinized wheat starch being suspended in the water in the presence of the other constituents, the amounts of gelatinized wheat starch, gelatinized hydroxyalkyl wheat starch and alkaline earth metal hydroxide being up to 20.5, 2.84–24 and 0.2–0.5 parts per 100 parts of ungelatinized wheat starch, respectively.

6. An improved adhesive composition for use in making corrugated paperboard which consists essentially of ungelatinized starch, gelatinized hydroxyalkyl starch, a water-soluble borate, a suspension stabilizer, a water-soluble alkali metal phosphate, an alkaline earth metal hydroxide, and water, the ungelatinized starch being suspended in the water in the presence of the other constituents, the amounts of gelatinized hydroxyalkyl starch and alkaline earth metal hydroxide being 2.84–24 and 0.2–1.16 parts per 100 parts of ungelatinized starch, respectively.

7. An improved adhesive composition for use in making corrugated paperboard which consists essentially of ungelatinized wheat starch, gelatinized wheat starch, gelatinized hydroxyalkyl wheat starch, sodium borate, bentonite, trisodium phosphate, calcium hydroxide, and water, the amounts of gelatinized wheat starch, gelatinized hydroxyalkyl wheat starch, and calcium hydroxide are up to 20.5, 2.84–24 and 0.2–0.5 parts per 100 parts of ungelatinized wheat starch, respectively.

References Cited in the file of this patent

UNITED STATES PATENTS

| | | |
|---|---|---|
| 2,051,025 | Bauer | Aug. 18, 1936 |
| 2,833,759 | Hobbs et al. | May 6, 1958 |
| 2,845,417 | Kesseler et al. | July 29, 1958 |
| 2,881,086 | Wimmer | Apr. 7, 1959 |
| 3,062,810 | Hjermstad et al. | Nov. 6, 1962 |